(No Model.)
F. W. EAMES.
Pipe Coupling.
No. 241,324.                    Patented May 10, 1881.
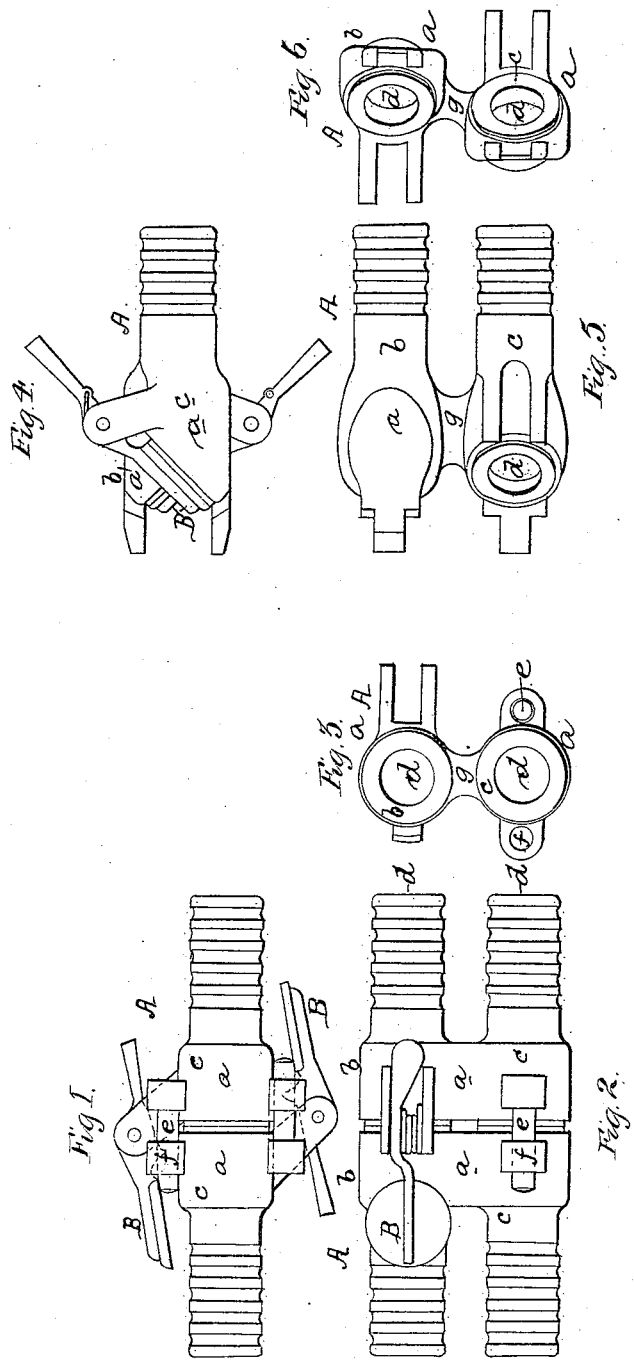
WITNESSES:
D. B. Gallatin
Jos. Lyons.
INVENTOR.
F. W. Eames
By Hannay & Brock
ATTORNEYS.

UNITED STATES PATENT OFFICE.

FREDERICK W. EAMES, OF WATERTOWN, NEW YORK.

PIPE-COUPLING.

SPECIFICATION forming part of Letters Patent No. 241,324, dated May 10, 1881.

Application filed October 20, 1880. (No model.) Patented in England February 15, 1879.

*To all whom it may concern:*

Be it known that I, FREDERICK W. EAMES, a citizen of the United States, residing at Watertown, in the county of Jefferson and State of New York, have invented certain new and useful Improvements in Pipe-Couplings, (Case B;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, said invention having been patented to me by the government of Great Britain on the 15th day of February, A. D. 1879, No. 616.

My invention has relation to the coupling together of the brake pipe or pipes between the cars of a train; and for this purpose it consists in the following construction and arrangement of the couplings, whereby the proper lines of pipes intended to be joined may be coupled beyond the possibility of a mistake, and in a neat and convenient manner, and with less labor and time than is possible with the old form of single coupling for each line of pipes.

Figures 1, 2, and 3 represent side, plan, and end elevations of a device for embodying my invention. Figs. 4, 5, and 6 represent side, plan, and end elevations of a modified form of the same couplings.

In Figs. 1, 2, and 3 is represented a butt-coupling, A, comprising the two halves *a a*, which are counterparts of each other. Each double half-coupling *a* has two divisions, *b c*, each having an independent opening or passage, *d*, connecting with one of the continuous brake-pipes. The division *b* of the coupling I prefer to construct with a valve, B, like those heretofore patented to me, which shall cover the ends of the divisions *b* when uncoupled, and the other division, *c*, of the coupling without a valve; but both sections of the double couplings may be provided with valves or without valves; or the division *c* may be provided with valves and the other division, *b*, be without them, if desired. The coupling A is provided with suitable bolts, *e*, and eyes *f*, and with retaining-catches attached to the valve-lever or otherwise, to prevent the couplings from becoming detached except under unusual strain.

In Figs. 4, 5, and 6 are represented a modified form of coupling, it being substantially the same as the coupling patented to me; but in this case the counterparts of a single coupling are arranged side by side in the manner shown, and connected by means of a web of metal, *g*, and which constitutes a double half-coupling corresponding with those shown in Figs. 1, 2, and 3, and for the same purpose. In this modification each division *b c* of the coupling is provided with a valve, B. The modified form shows the double half-coupling having inclined contact-faces for the two sets of couplings reversed. This construction prevents the liability of mistake when coupling the ends of the double lines of pipes between the cars.

If desired, three or more sets of single couplings may be joined in the manner heretofore set forth.

Having described my invention, what I claim as new, and desire to secure by Letters Patent, is—

1. A coupling each half of which is a counterpart of the other, formed with two separate sets of openings or passages, whereby two lines of pipe may be coupled, substantially as and for the purpose set forth.

2. A double coupling, each half consisting of two parts united by a web, substantially as set forth.

3. A coupling each half of which is a counterpart of the other, formed with two separate sets of openings or passages, one or both sets of which are provided with a valve or valves for closing the ends of the couplings when uncoupled, substantially as set forth.

4. A coupling each half of which is a counterpart of the other, formed with two sets of passages, and each half of the set being provided with a valve on one side and a bolt-fastening on the other, substantially as set forth.

In testimony whereof I affix my signature in presence of two witnesses.

F. W. EAMES.

Witnesses:
CHAS. D. BINGHAM,
E. D. EAMES.